United States Patent
Oh et al.

(10) Patent No.: US 11,059,262 B2
(45) Date of Patent: Jul. 13, 2021

(54) METHOD OF PREPARING LOW-DUST AND HIGH-INSULATION AEROGEL BLANKET

(71) Applicant: LG CHEM, LTD, Seoul (KR)

(72) Inventors: Kyoung Shil Oh, Daejeon (KR); Je Kyun Lee, Daejeon (KR); Dong Sik Bae, Daejeon (KR); Jeong Hun Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 350 days.

(21) Appl. No.: 15/576,264

(22) PCT Filed: Feb. 3, 2017

(86) PCT No.: PCT/KR2017/001167
§ 371 (c)(1),
(2) Date: Nov. 21, 2017

(87) PCT Pub. No.: WO2017/171217
PCT Pub. Date: Oct. 5, 2017

(65) Prior Publication Data
US 2018/0147811 A1     May 31, 2018

(30) Foreign Application Priority Data

Mar. 28, 2016  (KR) .................. 10-2016-0036640
Dec. 21, 2016  (KR) .................. 10-2016-0176015

(51) Int. Cl.
*C01B 33/146*    (2006.01)
*B32B 5/26*      (2006.01)
(Continued)

(52) U.S. Cl.
CPC ............ *B32B 5/26* (2013.01); *B01J 13/0091* (2013.01); *B32B 5/022* (2013.01); *B32B 17/06* (2013.01);
(Continued)

(58) Field of Classification Search
CPC .................................................................
B32B 5/022; B32B 5/26; B32B 17/06;
C01B 33/146; C01B 33/1585
(Continued)

(56) References Cited

U.S. PATENT DOCUMENTS 2,678,132 A * 5/1954 Beard, Jr. .............. B01D 15/02
210/658
4,046,948 A * 9/1977 Zlochower ............ C03C 13/005
428/392
(Continued)

FOREIGN PATENT DOCUMENTS

CN    102557577       7/2012
CN    102557577 A  *  7/2012  ............. C04B 35/82
(Continued)

OTHER PUBLICATIONS

Zou, N. et al. "Application Technology of Thermal Insulation Materials," China Petrochemical Press, 1st edition, Sep. 30, 2005, p. 211, line 28-40.

*Primary Examiner* — Nathan H Empie
(74) *Attorney, Agent, or Firm* — Dentons US LLP

(57) ABSTRACT

The present invention relates to a method of preparing an aerogel blanket in which, a surface of a base material for a blanket is activated and roughness and porosity of the surface of the base material for a blanket are increased to increase adhesion performance of a silica aerogel by inducing etching of a surface of a base material for a blanket using an acidic solution, and mechanical flexibility is increased and the generation of dust is minimized by further performing a gel deformation process of introducing cracks into the aerogel, and a low-dust and high-insulation aerogel blanket prepared according to the present invention.

2 Claims, 5 Drawing Sheets

(51) Int. Cl.

| | | |
|---|---|---|
| *C01B 33/158* | (2006.01) | |
| *B01J 13/00* | (2006.01) | |
| *C04B 35/82* | (2006.01) | |
| *C03C 15/00* | (2006.01) | |
| *C04B 28/24* | (2006.01) | |
| *B32B 5/02* | (2006.01) | |
| *B32B 17/06* | (2006.01) | |
| *C04B 111/28* | (2006.01) | |

(52) U.S. Cl.
CPC ........ *C01B 33/146* (2013.01); *C01B 33/1585* (2013.01); *C03C 15/00* (2013.01); *C04B 28/24* (2013.01); *C04B 35/82* (2013.01); *B32B 2260/023* (2013.01); *B32B 2260/04* (2013.01); *C04B 2111/28* (2013.01); *C04B 2201/32* (2013.01); *C04B 2235/3201* (2013.01); *C04B 2235/3427* (2013.01); *C04B 2235/616* (2013.01)

(58) Field of Classification Search
USPC ...................................................... 427/376.1
See application file for complete search history.

(56) References Cited

U.S. PATENT DOCUMENTS

| | | | |
|---|---|---|---|
| 4,204,907 A * | 5/1980 | Korklan | C04B 28/24 |
| | | | 162/135 |
| 5,789,075 A | 8/1998 | Frank et al. | |
| 5,866,027 A | 2/1999 | Frank et al. | |
| 6,492,014 B1 | 12/2002 | Rolison et al. | |
| 8,021,583 B2 | 9/2011 | Rouanet et al. | |
| 8,703,284 B1 * | 4/2014 | Meeks-Matous | C01B 33/163 |
| | | | 428/317.9 |
| 9,663,376 B2 | 5/2017 | Oikawa et al. | |
| 2007/0020917 A1 * | 1/2007 | Brook | B01J 20/285 |
| | | | 438/622 |
| 2015/0360961 A1 | 12/2015 | Oikawa et al. | |

FOREIGN PATENT DOCUMENTS

| | | |
|---|---|---|
| JP | S62-143818 | 6/1987 |
| JP | S63-064911 | 3/1988 |
| JP | H06-191822 | 7/1994 |
| JP | H10-504792 | 5/1998 |
| JP | H10-504793 | 5/1998 |
| JP | 2005-015309 | 1/2005 |
| JP | 2014-237910 | 12/2014 |
| JP | 2016-003159 | 1/2016 |
| KR | 100385829 | 10/2003 |
| KR | 20070100738 | 10/2007 |
| KR | 101105436 | 1/2012 |
| KR | 20150090320 | 8/2015 |
| KR | 20150122196 | 10/2015 |
| WO | 2008051029 | 5/2008 |

* cited by examiner

METHOD OF PREPARING LOW-DUST AND HIGH-INSULATION AEROGEL BLANKET

CROSS-REFERENCE TO RELATED APPLICATION

This application is a National Stage Application of International Application No. PCT/KR2017/001167 filed on Feb. 3, 2017, which claims priority to and the benefit of Korean Patent Application No. 10-2016-0036640, filed on Mar. 28, 2016, and Korean Patent Application No. 10-2016-0176015, filed on Dec. 21, 2016, all of which are incorporated herein by reference in their entirety for all purposes as if fully set forth herein.

TECHNICAL FIELD

The present invention relates to a method of preparing an aerogel blanket including a step of inducing etching of a surface of a base material for a blanket using an acidic solution, and a low-dust and high-insulation aerogel blanket prepared by the preparation method.

BACKGROUND ART

Since aerogels are super-porous materials having a porosity of about 90 to 99.9%, a pore size in the range of 1 to 100 nm and a high specific surface area ($\geq 500$ m$^2$/g), and also are materials having excellent properties such as super lightweight/super insulation/ultra-low dielectric properties, research on the development of aerogel materials as well as research on applications as transparent insulation materials, environmentally-friendly high-temperature insulation materials, ultra-low dielectric thin films for highly integrated devices, catalysts and catalyst supports, electrodes for supercapacitors, and electrode materials for seawater desalination have been actively conducted.

The biggest advantage of aerogels is that aerogels is super-insulation having a thermal conductivity of 0.300 W/m·K or less which is lower than that of organic insulation materials such as a typical Styrofoam, and can resolve the problem of fire vulnerability and the generation of harmful gas in the case of fire, which are fatal weaknesses of organic insulation materials.

Generally, aerogels are prepared by preparing a hydrogel from a silica precursor such as water glass or tetraethyl orthosilicate (TEOS), and removing a liquid component in the hydrogel without destroying the microstructure. Typical forms of silica aerogels may be divided into three types including powder, granules, and monoliths, and a silica aerogel is generally prepared in the form of powder.

The silica aerogel powder may be commercialized in a form, such as an aerogel blanket or aerogel sheet, by compositing with fibers, and the blanket or sheet may be bent, fold or cut in any size or shape due to having flexibility. Accordingly, the silica aerogel may be applied not only to industrial applications such as heat insulation panels for liquefied natural gas (LNG) carriers, industrial insulation materials and spacesuits, transportation and automobiles, and insulation materials for electric power generation, but also to household goods such as jackets and athletic shoes. Further, in a case where a silica aerogel is used in a fire door as well as a roof or floor in a house such as an apartment has a great effect in preventing fires.

Specifically, the aerogel blanket in the present specification is a concept of a material in which an aerogel is impregnated into a base material for a blanket such as a fiber and the like. A method of preparing the aerogel blanket is classified into a gel casting method and a method in which aerogel powder or granules are prepared and then deposited in a base material for a blanket using a binder.

Currently, the products manufactured by the gel casting method are mostly used due to having excellent physical properties, but the biggest disadvantage in practical application is the generation of dust. This is because the adhesion between the base material for a blanket used as a reinforcing agent and the aerogel is weak so that the base material for a blanket and the aerogel are easily separated. Further, when the product is manufactured in a flexible form such as a heat insulating material or a sound absorbing material for a curved surface, the above-described issues are exacerbated.

In order to address the above-described issues, U.S. Pat. No. 8,021,583 discloses that an aerogel powder or granule is prepared and filled in a slurry form between fibers to reduce the generation of dust. However, there was a problem in that thermal conductivity was increased by a binder or the like compared to the gel casting method.

The inventors of the present invention have conducted extensive research to minimize the generation of dust when preparing an aerogel blanket having high flexibility using a gel casting method, thereby completing the present invention.

PRIOR ART LITERATURE (Patent literature 1) U.S. Pat. No. 8,021,583 (registered on Sep. 20, 2011)

DISCLOSURE

Technical Problem

One objective of the present invention is to provide a method of preparing an aerogel blanket in which, etching of a surface of a base material for a blanket is induced using an acidic solution such that a surface of a base material for a blanket is activated, roughness and porosity of the surface of the base material for a blanket are increased to increase adhesion performance of a silica aerogel, and thereby the generation of dust is minimized.

Another objective of the present invention is to provide a method of preparing an aerogel blanket in which, mechanical flexibility is increased and the generation of dust is minimized by inducing etching of the surface of the base material for a blanket using an acidic solution, and performing a gel deformation process.

Still another objective of the present invention is to provide a low-dust and high-insulation aerogel blanket prepared by the above-described method of preparing an aerogel blanket.

Technical Solution

In order to achieve the above-described objectives, the present invention provides a method of preparing an aerogel blanket, including: a) preparing a base material for a blanket which is surface-treated with an acidic solution; b) preparing a silica sol including a water glass solution; c) impregnating the surface-treated base material for a blanket with the silica sol; d) gelling the silica sol in a state in which the base material for a blanket is impregnated with the silica sol; and e) surface-modifying and drying.

Further, the present invention provides an aerogel blanket prepared by the above-described preparation method.

Advantageous Effects

In the preparation method of the present invention, etching of a surface of a base material for a blanket is induced using an acidic solution such that a surface of a base material for a blanket is activated, and roughness and porosity of the surface of the base material for a blanket are increased to increase adhesion performance of a silica aerogel.

Accordingly, adhesion of aerogel particles to the surface of the base material for a blanket is increased to reduce the generation of dust, the base material for a blanket is uniformly coated with a large amount of aerogel particles to improve thermal conductivity, and thereby a low-dust and high-insulation aerogel blanket can be prepared.

Further, an aerogel blanket with high flexibility can be prepared, in which mechanical flexibility is increased and the generation of dust is minimized by inducing etching of the surface of the base material for a blanket using the acidic solution and further performing a gel deformation process.

BEST MODE OF THE INVENTION

Figure 1:
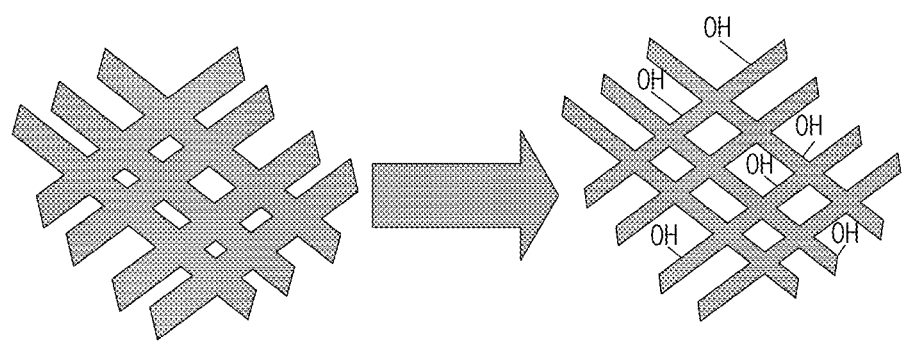
FIG. 1 is a schematic view showing glass felt which is surface-treated with an acidic solution.

Hereinafter, the present invention will be described in detail in order to facilitate understanding of the present invention. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The present invention provides a method of preparing an aerogel blanket, including: a) preparing a base material for a blanket which is surface-treated with an acidic solution; b) preparing a silica sol including a water glass solution; c) impregnating the surface-treated base material for a blanket with the silica sol; d) gelling the silica sol in a state in which the base material for a blanket is impregnated with the silica sol; and e) surface-modifying and drying.

Hereinafter, each step of the method of preparing an aerogel blanket of the present invention will be described in detail.

Step a)

Step a) according to an embodiment of the present invention is a step for increasing adhesion performance of a silica aerogel by increasing roughness and porosity of the surface of the base material for a blanket in the aerogel blanket, in which the base material for a blanket is pre-treated with an acidic solution.

The acidic solution usable in Step a) may include one or more selected from the group consisting of acetic acid ($CH_3COOH$), hydrochloric acid (HCl) and nitric acid ($HNO_3$).

Further, the base material for a blanket usable in the present invention may be a film, a sheet, a net, a fiber, a porous material, a foam, a nonwoven fabric or a laminate of two layers thereof. Further, surface roughness may be formed on the surface or the surface may be patterned depending on the application. More specifically, the base material for a blanket may be a fiber including spaces or pores in which silica aerogel can be easily inserted into the base material for a blanket to improve thermal insulation performance. Further, the base material for a blanket preferably has low thermal conductivity.

Specifically, the base material for a blanket may be a polyamide, polybenzimidazole, a polyaramid, an acrylic resin, a phenol resin, polyester, polyetheretherketone (PEEK), a polyolefin (e.g., polyethylene, polypropylene or copolymers thereof), cellulose, carbon, cotton, wool, hemp, a non-woven fabric, glass felt, ceramic wool or the like, and more specifically, the base material for a blanket may be glass felt in the present invention.

In the present invention, when the surface of the glass felt is treated with an acidic solution, the acidic solution can activate the fiber surface and increase roughness and porosity by inducing etching of the fiber surface.

Specifically, the acidic solution may break the bond of $SiO_2$ on the surface of the glass felt to reduce the diameter of a glass felt strand. As the diameter of the glass felt decreases, the pores of the glass felt relatively increase, thereby increasing the porosity of the glass felt.

Further, as OH groups are formed on the surface of the glass felt, the glass felt is chemically bonded more tightly with the aerogel, thereby significantly reducing the generation of dust which has been pointed out as a problem of a conventional aerogel blanket.

As described above, the glass felt which is surface-treated with an acidic solution has increased porosity and roughness of the surface of the glass felt as compared with glass felt which is not surface-treated with an acidic solution, thereby increasing the bonding force of aerogel particles to glass felt. Accordingly, a problem of the generation of dust in which an aerogel powder falls out of an aerogel blanket after drying can be resolved, and a large amount of aerogel can be uniformly adhered to the fiber to improve thermal conductivity.

Step b)

Step b) according to an embodiment of the present invention is a step of preparing a silica sol, and the silica sol is prepared by mixing a silica precursor with an alcohol.

The silica precursor usable in the preparation of the silica sol may be a silicon-containing alkoxide compound such as tetramethyl orthosilicate (TMOS), tetraethyl orthosilicate (TEOS) and the like. However, the present invention may additionally have an advantage of a low manufacturing cost by using an inexpensive water glass solution instead of a raw material of an expensive silicon-containing alkoxide-based compound.

In the present invention, the water glass solution may refer to a diluted solution prepared by adding distilled water to water glass and mixing. The water glass may be sodium silicate ($Na_2SiO_3$) which is an alkali silicate obtained by melting silicon dioxide ($SiO_2$) and an alkali.

Further, the water glass solution may include silica in an amount of 1 to 20 wt %. When the content of the silica is less than 1 wt %, the content of the silica aerogel in the finally prepared blanket is excessively low, so that the chemical properties such as an insulation effect at the desired level cannot be expected. When the content of the silica is more than 20 wt %, a raw material cost rises, and the mechanical property, particularly flexibility, of the blanket is deteriorated due to formation of an excess of silica aerogel.

Further, specific examples of the alcohol usable in the preparation of the silica sol of the present invention include monohydric alcohols such as methanol, ethanol, isopropanol, butanol and the like; or polyhydric alcohols such as glycerol, ethylene glycol, propylene glycol, diethylene glycol, dipropylene glycol, and sorbitol, and one or a mixture of two or more thereof may be used. Among these, the alcohol may be a monohydric alcohol having 1 to 6 carbon atoms such as methanol, ethanol, isopropanol, butanol and the like, considering miscibility with water and an aerogel.

Such an alcohol (polar organic solvent) may be used in a suitable amount in consideration of the silica aerogel to be finally prepared.

Step c)

Step c) according to an embodiment of the present invention is a preparation step for a silica gel composite, in which the surface-treated base material for a blanket is impregnated with the silica sol.

The impregnation step may be performed in a reaction container capable of accommodating the base material for a blanket, and deposition may be performed by pouring a silica sol into the reaction container or putting the base material for a blanket into the reaction container containing the silica sol to be immersed. Here, the base material for a blanket may be lightly pressed to be sufficiently immersed in order to improve the bonding between the base material for a blanket and the silica sol. Thereafter, the base material for a blanket may be pressed to a certain thickness at a constant pressure to remove an excess of silica sol to reduce the subsequent drying time.

Step d)

Step d) according to an embodiment of the present invention is a step for preparing a silica gel composite, and may be performed by a gelation reaction by adding an acid catalyst in a state in which the base material for a blanket is impregnated with the silica sol.

In the present invention, the gelation may refer to the formation of a network structure from the silica precursor material, and the network structure may refer to a planar net-like structure in which a certain polygon having one or more types of atomic arrays is connected or a three-dimensional skeleton structure formed by sharing a vertex, an edge, and a face of a specific polyhedron.

Examples of the acid catalyst which may be used to induce the gelation reaction include one or more selected from the group consisting of nitric acid, hydrochloric acid, sulfuric acid and hydrofluoric acid, and the acid catalyst may be added such that the molar ratio of the acid catalyst is in the range of 1 to 5 with respect to silicon dioxide in the water glass solution, and the pH of the silica sol is in the range of 3 to 9.

In addition, the method according to an embodiment of the present invention may further include an aging step such that the silica gel is allowed to stand at a suitable temperature to ensure a complete chemical change.

The aging step may more firmly form the network structure formed, thereby improving the mechanical stability of the aerogel blanket of the present invention.

In the aging step of the present invention, a solution prepared by diluting a basic catalyst such as sodium hydroxide (NaOH), potassium hydroxide (KOH), ammonium hydroxide ($NH_4OH$), trimethylamine, pyridine and the like in an organic solvent to have a concentration of 1 to 10% is added to induce an Si—O—Si bonding in the aerogel as much as possible to allow the net structure of silica gel to be stronger, thereby further facilitating the maintenance of the pore structure in the subsequent rapid drying process.

Further, it is required to perform the aging step within the suitable temperature range to strengthen the optimal pore structure, and the aging step of the present invention may be performed by allowing the silica gel to stand at a temperature of 30 to 70° C. for 1 to 10 hours. When the aging temperature is less than 30° C., the aging time may become excessively long, leading to an increase in the total process time and a decrease in productivity. When the aging temperature is more than 70° C., since the aging temperature exceeds the boiling point of ethanol, the loss of the solvent due to evaporation may increase and the raw material cost may increase.

Further, the preparation method according to an embodiment of the present invention may further include a solvent replacement step.

After preparing a wet gel from a silica precursor such as water glass, a liquid component in the wet gel is removed without destroying a microstructure. Here, pores of the wet gel are filled with water, but when a solvent is removed through the subsequent drying process, the liquid solvent vaporizes into the vapor phase, and thereby shrinkage and cracking of the pore structure are caused due to high surface tension of water at a gas/liquid interface. As a result, a decrease in specific surface area and a change in the pore structure in the finally prepared silica aerogel are caused. Accordingly, it is required to replace water having a high surface tension with an organic solvent having a relatively low surface tension in order to maintain the pore structure of the wet gel.

Examples of the solvent which may be mixed with the silica gel after gelation, as the solvent for replacement, include hydrophilic polar organic solvents, specifically, alcohol-based solvents including monohydric alcohols such as methanol, ethanol, isopropanol or butanol; polyhydric alcohols such as glycerol, ethylene glycol, propylene glycol, diethyl glycol, dipropylene glycol or sorbitol; and a mixture of one or more thereof. Among these, more specifically, monohydric alcohol-based solvents having 1 to 6 carbon atoms such as methanol, ethanol, isopropanol or butanol may be used considering the miscibility with water and a hydrophobic aerogel.

Step e)

Step e) according to an embodiment of the present invention is a step for preparing a hydrophobic aerogel blanket, in which the hydrophobic aerogel blanket may be prepared by performing a step of surface-modifying and drying the silica gel composite.

The dried silica aerogel maintains low thermal conductivity immediately after drying, but the thermal conductivity gradually increases because a hydrophilic silanol group (Si—OH) present on the surface of the silica absorbs water in the air. Accordingly, it is necessary to modify the surface of the silica aerogel to be hydrophobic in order to maintain low thermal conductivity.

Therefore, according to an embodiment of the present invention, the surface modification of Step e) may be performed using a surface modifier including a polar solvent and an organosilane compound.

Examples of the polar solvent include methanol, ethanol, isopropyl alcohol and the like, and examples of the organosilane compound include trimethylchlorosilane (TMCS), hexamethyldisilazane (HMDS), methyltrimethoxysilane, trimethylethoxysilane, ethyltriethoxysilane, phenyltriethoxysilane, etc.

The surface modifier is preferably mixed in a volume ratio of 1 to 10 with respect to the gel in the case of a solvent and in a volume ratio of 0.1 to 10 with respect to the gel in the case of the organosilane compound. When the volume ratio of the organosilane compound is less than 0.1, the reaction time becomes excessively long, thereby reducing surface modification efficiency. When the volume ratio of the organosilane compound is more than 10, there is a problem of rising costs, and an unreacted surface modifier may cause shrinkage during drying.

Further, the preparation method according to an embodiment of the present invention may further include a washing step before the drying. The washing step is a step for obtaining high-purity hydrophobic silica aerogel by removing impurities (sodium ions, unreacted product, by-products) generated during the reaction and residual ammonia which may react with $CO_2$ in supercritical drying to form ammonium carbonate salts, and may be carried out by a dilution process or a replacement process using a nonpolar organic solvent.

Further, the drying step according to the preparation method of the present invention may be performed by a process of removing the solvent while maintaining the pore structure of the aged silica gel, and the drying step may be performed by a supercritical drying or atmospheric pressure drying process.

The supercritical drying process may be carried out using supercritical carbon dioxide. Carbon dioxide ($CO_2$) is in a gaseous state at room temperature and atmospheric pressure, but when a temperature exceeds a certain temperature and high pressure limit, called a supercritical point, carbon dioxide does not evaporate and enters a critical state in which gas and liquid cannot be distinguished. Carbon dioxide in the critical state is called supercritical carbon dioxide.

Supercritical carbon dioxide has a molecular density close to that of a liquid, but has low viscosity, and thus has gas-like properties, and is rapidly diffused and has high thermal conductivity, which results in high drying efficiency and a short drying time.

Specifically, in the supercritical drying process, the aged silica gel is put in a supercritical drying reactor, and the reactor is filled with $CO_2$ in the liquid state to perform a solvent replacement process of replacing the alcohol solvent in the silica aerogel with $CO_2$. Thereafter, the temperature is raised to 40 to 50° C. at a constant temperature raising rate, specifically 0.1 to 1° C./min, and then a pressure above the pressure at which carbon dioxide is in the supercritical state, specifically, a pressure of at least 100 to 150 bar is maintained for a certain period of time, specifically 20 minutes to 1 hour, maintaining the supercritical state of carbon dioxide. Generally, the carbon dioxide becomes supercritical at a temperature of 31° C. and a pressure of 73.8 bar. The carbon dioxide is maintained at a constant temperature and a constant pressure, at which the carbon dioxide becomes a supercritical state, for 2 to 12 hours, more specifically 2 to 6 hours, and then the pressure is gradually removed to complete the supercritical drying process to prepare an aerogel blanket.

Further, in the case of atmospheric pressure drying process, the process may be performed by conventional methods such as natural drying at a temperature of 70 to 200° C. and atmospheric pressure (1±0.3 atm).

As a result of the drying process as described above, a blanket containing a porous silica aerogel having nano-sized pores can be prepared. The silica aerogel has high hydrophobicity and excellent physical properties, particularly, low tap density and high porosity, and a blanket containing the silica aerogel has excellent mechanical flexibility as well as low thermal conductivity.

Further, a pressing process for adjusting a thickness and uniformizing the internal structure and surface shape of the blanket, a molding process for forming a proper shape or morphology depending on the application, a laminating process for laminating separate functional layers and the like may be further performed before or after the drying process.

According to an embodiment of the present invention, the method of preparing an aerogel blanket of the present invention may further include a step of performing a gel deformation process of introducing cracks into the gel after Step d) and before Step e).

Generally, the aerogel has a very low density and a high porosity, which results in low mechanical stability and flexibility of the aerogel itself. Particularly, in the case of an aerogel having a porosity of more than 60% and a density of 0.6 g/cm³, the above-described problems are even more serious. Therefore, the aerogel has a disadvantage of low flexibility and low mechanical stability when the aerogel blanket is applied to a heat insulating material or a sound absorbing material for use on a curved surface. As the flexibility is increased, the adhesion between the base material for a blanket and the aerogel is further weakened, and thereby a problem of dust generation is intensified.

On the other hand, since the flexibility of the aerogel blanket is influenced by each of the flexibility of the base material for a blanket and the aerogel, it was intended to prepare an aerogel blanket which has a high flexibility and in which the generation of dust is minimized by subjecting each of the base material for a blanket and the aerogel to a certain treatment in the present invention.

Accordingly, in the preparation method of the present invention, the surface of the base material for a blanket is activated, roughness and porosity of the surface of the base material for a blanket are increased to improve the flexibility of the base material for a blanket itself, and adhesion performance of a silica aerogel is increased to minimize the generation of dust in the aerogel blanket by performing Step a) of inducing etching of the surface of the base material for a blanket using an acidic solution.

Further, in the preparation method of the present invention, the mechanical flexibility of the aerogel itself is increased by performing a gel deformation process of introducing cracks into the silica gel.

In the present invention, the cracks refer to cracks distributed throughout the aerogel blanket.

Specifically, the gel deformation process is performed by winding the base material for a blanket impregnated with the silica gel around a cylinder once such that one side comes in contact with the cylinder, and another step of winding once such that another side comes in contact with the cylinder, and the process is repeated once or more after the base material for a blanket is rotated by 90°.

The aerogel blanket of the present invention may form uniform cracks over the entire area to increase the mechanical flexibility due to the above-described process. Further, the crack may be suitably controlled by the diameter of cylinder and the hardness of gel (for example, controlled by aging). For example, the smaller the diameter of cylinder is, the greater the diameter or number of cracks is, thereby increasing mechanical flexibility. The diameter of cylinder usable in the present invention is preferably in the range of 2 to 10 cm.

Accordingly, the aerogel blanket of the present invention may include cracks and aerogel fragments with an average volume of 0.001 to 1 cm$^3$ surrounded by the cracks through the above-described gel-deformation process. In the present invention, the aerogel fragment refers to a mass of aerogel cracked by cracks generated through a gel deformation process.

In the present invention, the aerogel blanket which has high flexibility and in which the generation of dust is minimized may be prepared by Step a) and the gel deformation process.

Further, the present invention may provide an aerogel blanket prepared by the preparation method according to the present invention.

Specifically, the blanket includes silica aerogel at least one surface and the inside of the base material for a blanket. More specifically, the silica aerogel may be included in an amount of 20 to 80 wt % based on the total weight of the blanket. As the content of the silica aerogel in the blanket increases, heat insulation properties are increased, but when the content of the silica aerogel is more than 80 wt %, the strength and adhesion of the blanket may be lowered due to low strength and adhesion of the silica aerogel itself when the blanket is prepared. Further, when the content of the silica aerogel in the blanket is too low, and specifically, is less than 20 wt %, heat insulation properties may be deteriorated.

Further, the aerogel blanket prepared by the preparation method of the present invention may have an improved thermal conductivity of 10 to 20 mW/mK because the adhesion of a silica aerogel is increased by inducing etching of the surface of the base material for a blanket using an acidic solution, and thus the base material for a blanket is uniformly coated with a large amount of aerogel particles. This is also the case when an aerogel blanket with high flexibility is prepared through a gel deformation process.

Accordingly, the aerogel blanket of the present invention may be effectively used as pipes of various types of industrial equipment, plant facilities for thermal insulation such as an industrial furnace, insulation materials, lagging materials or incombustible materials of airplanes, ships, automobiles, and architectural structures, etc.

MODES OF THE INVENTION

Now, the present invention will be described in more detail with reference to the following examples. These examples are provided only for illustration of the present invention and should not be construed as limiting the scope and spirit of the present invention.

Examples 1 to 3

Glass felt was treated with acetic acid (CH$_3$COOH) to prepare a silica sol containing 5.2 wt % of a water glass solution. The glass felt which was surface-treated with the acetic acid was impregnated with the silica sol, and treated with acetic acid as an acidic catalyst to induce gelation. Thereafter, after aging at 80° C. for 20 to 30 minutes, solvent replacement with methanol was performed at 50° C. 3 to 4 times. Subsequently, surface modification was performed at 50° C. with 70 v/v % methanol and 30 v/v % HMDS for 5 to 6 hours, the mixture was washed three times with hexane for 2 to 3 hours to remove byproducts, and then dried at 150° C. for 1 hour to prepare an aerogel blanket.

Examples 4 to 6

An aerogel blanket was prepared in the same manner as in Examples 1 to 3 except that the glass felt was treated with hydrochloric acid (HCl) instead of acetic acid.

Examples 7 to 9

An aerogel blanket was prepared in the same manner as in Examples 1 to 3 except that the glass felt was treated with nitric acid (HNO$_3$) instead of acetic acid.

Example 10

An aerogel blanket was prepared in the same manner as in Example 1 except that, before drying, the blanket impregnated with the silica gel was wound around a glass cylinder having a diameter of 10 cm such that one surface of the blanket came in contact with the glass cylinder, and was wound around the glass cylinder again such that another surface of the blanket came in contact with the glass cylinder, and the above-described process was repeated once after the base material for a blanket was rotated by 90°, thereby introducing cracks.

Comparative Examples 1 to 3

An aerogel blanket was prepared in the same manner as in Examples 1 to 3 except that glass felt which was not treated with acetic acid was used.

Experimental Example 1: Scanning Electron Microscope (SEM) Photography

Scanning electron micrograph (SEM) photographs of the aerogel blankets prepared according to Examples 2, 5 and 8 and Comparative Example 2 were taken (FIGS. 2 to 5).

Figure 2:
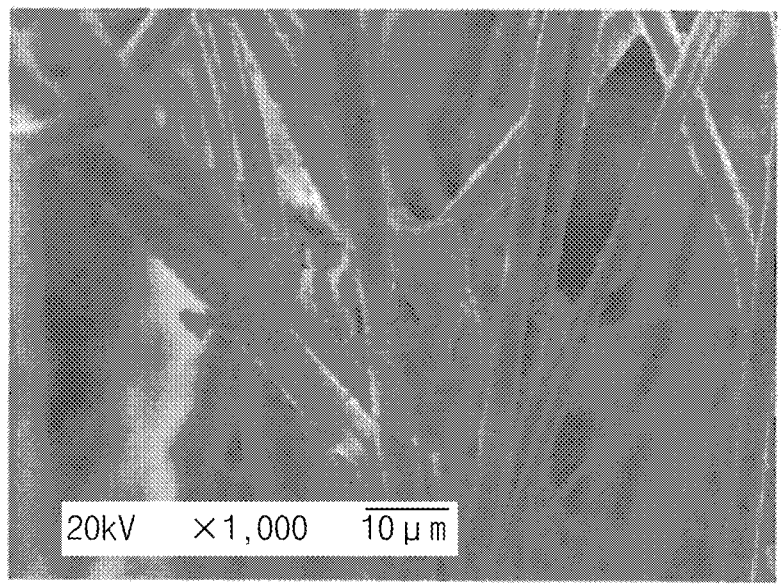
FIG. 2 is an SEM image showing an aerogel blanket prepared without treating with an acidic solution according to Comparative Example 2 of the present invention.
Figure 3:
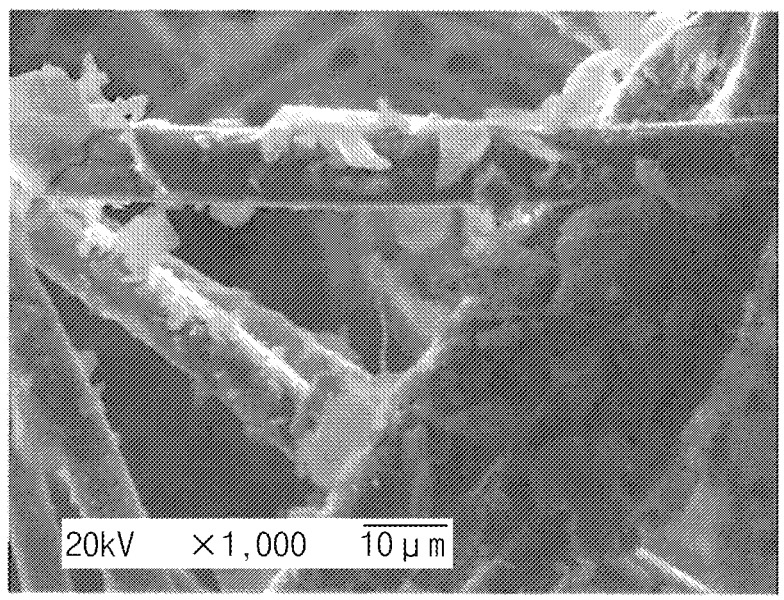
FIG. 3 is an SEM image showing an aerogel blanket prepared according to Example 2 of the present invention.
Figure 4:
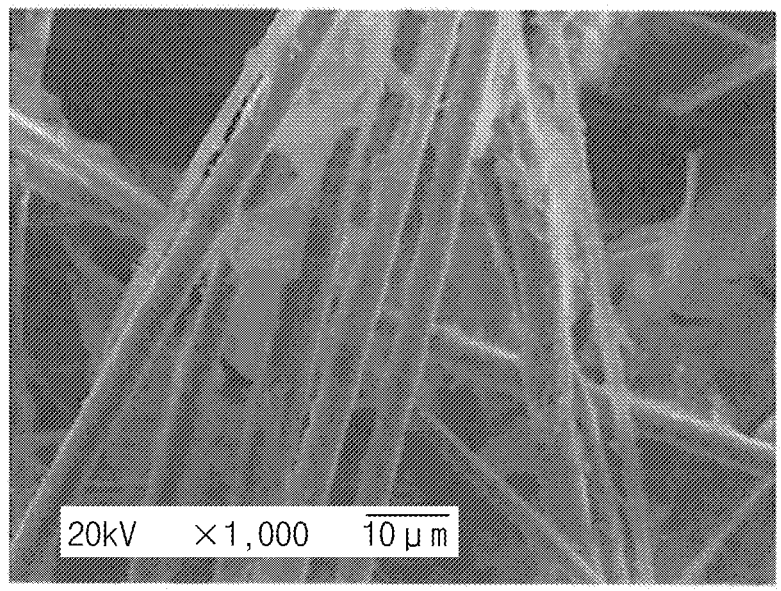
FIG. 4 is an SEM image showing an aerogel blanket prepared according to Example 5 of the present invention.
Figure 5:
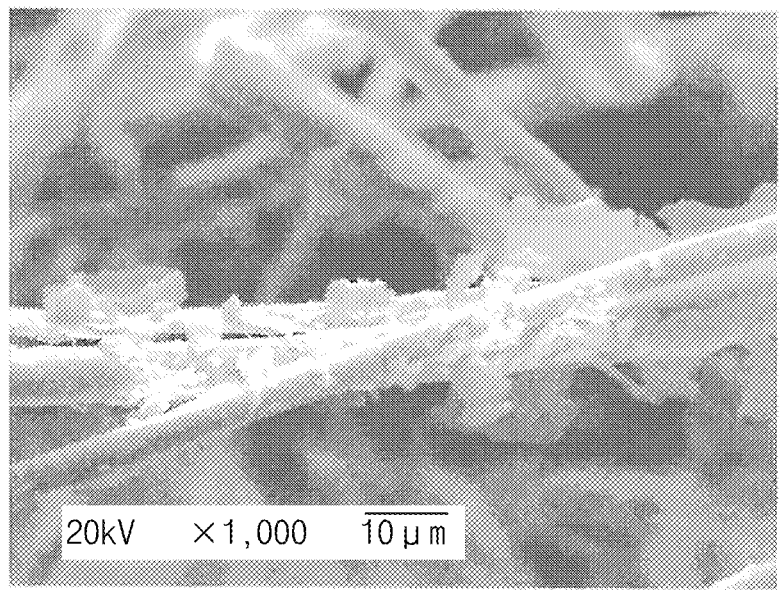
FIG. 5 is an SEM image showing an aerogel blanket prepared according to Example 8 of the present invention.

FIG. 2 (Comparative Example 2) shows glass felt untreated with an acidic solution, and FIGS. 3 to 5 (Examples 2, 5 and 8) respectively show aerogel blankets prepared using glass felt treated with acetic acid, hydrochloric acid or nitric acid at pH 4.7.

Referring to the drawings, it can be seen that the aerogel blanket of Comparative Example 2 in which glass felt untreated with an acidic solution was used had less aerogel on the fiber surface, while the aerogel blankets of Examples 2, 5 and 8 which were treated with an acidic solution had a larger amount of aerogel uniformly adhered to the fiber surface than the aerogel blanket of Comparative Example 2.

Experimental Example 2: Dust Generation Experiment

The aerogel blankets prepared according to Examples 1 to 9 and Comparative Examples 1 to 3 were cut to a size of 12.5×12.5 cm, folded 14 times and then shaken 20 times to measure a weight change (Weight reduction=(initial weight of aerogel blanket-weight of aerogel blanket after dust generation experiment)/(initial weight of aerogel blanket)× 100%). The measurement results are shown in the following Table 1.

Experimental Example 3: Measurement of Thermal Conductivity

The thermal conductivity of aerogel blankets prepared according to Examples 1 to 9 and Comparative Examples 1 to 3 was measured by a thermal conductivity meter using a heat flow method (HFM). The results are shown in the following Table 1.

TABLE 1

| | Type of acid for acid treatment | Gelation pH | Measurement of dust (Weight reduction rate, wt %) | Thermal conductivity (mW/mK) |
|---|---|---|---|---|
| Example 1 | Acetic acid | 3.5 | 7.6 | 19 |
| Example 2 | Acetic acid | 4.7 | 7.5 | 19 |
| Example 3 | Acetic acid | 9.0 | 7.5 | 19 |
| Example 4 | Hydrochloric acid | 3.5 | 7.8 | 20 |
| Example 5 | Hydrochloric acid | 4.7 | 7.8 | 20 |
| Example 6 | Hydrochloric acid | 9.0 | 7.7 | 20 |
| Example 7 | Nitric acid | 3.5 | 7.96 | 20 |
| Example 8 | Nitric acid | 4.7 | 7.8 | 20 |
| Example 9 | Nitric acid | 9.0 | 7.8 | 20 |
| Comparative Example 1 | — | 3.5 | 9.2 | 23 |
| Comparative Example 2 | — | 4.7 | 9.1 | 23 |
| Comparative Example 3 | — | 9.0 | 9.2 | 23 |

The degree of dust generation and thermal conductivity of aerogel blankets prepared according to Examples 1 to 9 and Comparative Examples 1 to 3 were measured.

It can be seen from Table 1 that, in the aerogel blankets of Examples 1 to 9 prepared using acid-treated glass felt, the generation of dust was significantly reduced and thermal conductivity was greatly improved as compared with the aerogel blankets of Comparative Examples 1 to 3 prepared using untreated glass felt.

This is because the fiber surface is activated and roughness and porosity of the fiber surface are increased by inducing etching of the fiber surface using an acidic solution, thereby increasing the adhesion performance of the silica aerogel.

As described above, in the present invention, a low-dust and high-insulation aerogel blanket may be prepared in which adhesion of aerogel particles to the fiber surface is increased to reduce the generation of dust, and the fiber is uniformly coated with a large amount of aerogel particles to improve thermal conductivity.

The above description of the invention is only exemplary, and it will be understood by those skilled in the art that various modifications can be made without departing from the scope of the present invention and without changing essential features. Therefore, the above-described examples should be considered in a descriptive sense only and not for purposes of limitation.

The invention claimed is:

1. A method of preparing an aerogel blanket, comprising:
a) preparing a base material for a blanket which is surface-treated with an acidic solution;
b) preparing a silica sol including a water glass solution containing silica in an amount of 5.2 wt % to 20 wt %;
c) impregnating the surface-treated base material for a blanket with the silica sol by immersing the surface-treated base material for a blanket in the silica sol in a reaction container containing the silica sol followed by pressing to a target thickness to remove an excess of silica sol;
d) gelling the silica sol in a state in which the base material for a blanket is impregnated with the silica sol by treating with acetic acid as an acidic catalyst to induce gelation, wherein a molar ratio of the acid catalyst with respect to silicon dioxide in the water glass solution is in the range of 1 to 5;
e) aging the base material impregnated with the gelled silica sol of step d) in the presence of a solution comprising an organic solvent and a basic catalyst selected from the group consisting of sodium hydroxide, potassium hydroxide, trimethylamine, and pyridine at a temperature of 30° C. to 70° C. for 1 to 10 hours;
f) performing a gel deformation process of introducing cracks into the gel;
g) performing a solvent replacement by washing with a monohydric alcohol-based solvent having 1 to 6 carbon atoms;
h) surface-modifying the gel of g) by mixing with a surface modifier comprising a polar solvent and an organosilane compound in a volume ratio of 1 to 10 with respect to the gel for 5 to 6 hours, wherein the polar solvent comprises methanol, ethanol, or isopropyl alcohol, and the organosilane compound comprises trimethylchlorosilane (TMCS), hexamethyldisilazane (HMDS), methyltrimethoxysilane, trimethylethoxysilane, ethyltriethoxysilane, or phenyltriethoxysilane;
i) washing with a nonpolar organic solvent for 2 to 3 hours; and
j) drying at a temperature of 70° C. to 200° C. and a pressure of 1±0.3 atm for 1 hour,
wherein the base material for a blanket is a glass fiber,
wherein the acidic solution in Step a) includes acetic acid (CH$_3$COOH), and
wherein the gel deformation process is performed by winding the base material for a blanket impregnated with the silica gel around a cylinder once such that one side comes in contact with the cylinder, and another step of winding once such that another side comes in contact with the cylinder, and the process is repeated once or more after the base material for a blanket is rotated by 90°.

2. The method according to claim 1, wherein the cylinder has a diameter in a range of 2 to 10 cm.

* * * * *